Patented Feb. 16, 1943

2,311,054

UNITED STATES PATENT OFFICE 2,311,054

PREPARATION OF AMINO COMPOUNDS

William O. Kenyon and Wesley G. Lowe, Rochester, N. Y., assignors to Eastman Kodak Company, Rochester, N. Y., a corporation of New Jersey No Drawing. Application June 30, 1939, Serial No. 282,317

3 Claims. (Cl. 260—562)

This invention relates to the reduction of the nitro groups of aromatic nitro compounds, in which enolizable groups are present, by means of hydrogen in aqueous alkali solution.

Amino derivatives having enolizable groups have a tendency to react with themselves to form undesirable products. Also, with this type of compound, reducing conditions may attack the compound at the enol grouping and thereby change the chemical constitution of the compound besides reducing, or instead of reducing, the nitro group.

An object of our invention is to provide a method for reducing aromatic nitro compounds containing enolizable groups in which the only point at which reduction takes place is at the aromatic nitro groups so that the constitution of the resulting amino compound may be predetermined. Another object of our invention is to prepare compounds containing amino and enolizable groups under such conditions that reaction between the amino and enolizable groups is substantially avoided. This invention is particularly applicable to the preparation of amino derivatives of couplers for making colored materials, such as dyes.

We have found that the reduction of a compound, containing enolizable groups, can be satisfactorily carried out by first dissolving the compound in dilute aqueous alkali and subsequently treating the compound with hydrogen in the presence of a reducing catalyst, such as a platinum oxide catalyst. The concentration of aqueous alkali may be varied. We have found that good results are obtained when the concentration of alkali is about one fifth normal, nevertheless, the reaction takes place satisfactorily at lower concentrations as well as higher concentrations, the criterion being the concentration which is most readily worked with under the conditions of operation. Although we have carried out reductions at elevated temperatures, in accordance with our process, we have found that a temperature of 20° C. plus or minus 10° C. gives quite satisfactory results and unless there is some special reason for cooling or heating, extra temperature conditions can be dispensed with. We have found that our method of reducing nitro derivatives containing enolizable groups to amino derivatives is superior, as regards yield, purity of product and convenience to the older methods of reduction employing other types of reducing agents, such as metallic tin and hydrochloric acid.

The following examples illustrate our invention. In our process rapid and complete reduction of the nitro groups is obtained with substantially no reduction of any carbonyl groups which may be present:

Example I 10 parts of m-nitro acetoacetanilide were suspended in 200 parts of water. 40 parts of a normal aqueous sodium hydroxide solution and 0.1 part of a platinum oxide reducing catalyst were added. The mass was kept at room temperature (approximately 20° C.) with a hydrogen pressure of 35 pounds accompanied by vigorous agitation. After 75 minutes, the solution was filtered and 10 parts of concentrated hydrochloric acid were added to the filtrate. The water was removed at reduced pressure until crystals of m-amino acetoacetanilide hydrochloride began to appear. The solution was chilled and the separated crystals filtered off. The yield was 70% of theoretical, the product having had an analysis of 11.9% nitrogen as compared with the theoretical percentage of nitrogen which is 12.2%. A sample prepared by reduction with tin and hydrochloric acid, even after a further refining by recrystallization, showed a nitrogen content of only 11%.

Example II 10 parts of 1-(p-nitro phenyl)-3-methyl-5-pyrazolone were suspended in 200 parts of water. 40 cc. of a normal aqueous solution of sodium hydroxide was added together with 0.1 part of a platinum oxide reducing catalyst. The mass was shaken at room temperature and under a pressure of 35 pounds of hydrogen. The mass was allowed to stand for 45 minutes following which the solution was filtered. 25 parts of concentrated hydrochloric acid was added and the water was removed by vacuum distillation. When the volume of the solution had decreased to 30 parts, concentrated hydrochloric acid was added and a precipitate of 1-(p-amino phenyl)-3-methyl-5-pyrazolone hydrochloride was obtained. The precipitate was filtered off and washed with methanol.

Other compounds of like nature may be reduced by the process described in this application, such as p-nitro benzoyl acetonitrile or other aromatic nitro compounds having enolizable groups.

We claim:

1. The reduction of m-nitro acetoacetanilide which comprises subjecting its solution in dilute aqueous alkali containing a hydrogenation catalyst to the action of hydrogen under pressure.

2. The reduction of m-nitro acetoacetanilide which comprises subjecting its solution in dilute aqueous sodium hydroxide containing a platinum oxide hydrogenation catalyst to the action of hydrogen under pressure.

3. The reduction of m-nitro acetoacetanilide which comprises subjecting its solution in normal aqueous sodium hydroxide containing a platinum oxide hydrogenation catalyst to the action of hydrogen under pressure.

WILLIAM O. KENYON.
WESLEY G. LOWE.